(12) United States Patent
Valluru (10) Patent No.: US 8,320,383 B2
(45) Date of Patent: Nov. 27, 2012

(54) METHOD AND APPARATUS FOR PROVIDING CALL ADMISSION CONTROL FOR VOIP OVER WIRELESS LOCAL AREA NETWORKS USING A TRANSPARENT PROXY AGENT

(75) Inventor: Sudhakar Valluru, San Jose, CA (US)

(73) Assignee: Alcatel Lucent, Paris (FR)

( * ) Notice: Subject to any disclaimer, the term of this patent is extended or adjusted under 35 U.S.C. 154(b) by 474 days.

(21) Appl. No.: 11/930,840

(22) Filed: Oct. 31, 2007

(65) Prior Publication Data

US 2009/0109977 A1    Apr. 30, 2009

(51) Int. Cl.
*H04L 12/28* (2006.01)
*H04L 12/56* (2006.01)
(52) U.S. Cl. .................................. 370/395.21
(58) Field of Classification Search ........................ None
See application file for complete search history.

(56) References Cited

U.S. PATENT DOCUMENTS

| | | | | |
|---|---|---|---|---|
| 6,714,987 | B1 * | 3/2004 | Amin et al. ..................... | 709/249 |
| 7,324,491 | B1 * | 1/2008 | Benveniste et al. ............ | 370/338 |
| 2002/0065063 | A1 * | 5/2002 | Uhlik et al. .................... | 455/404 |
| 2002/0152319 | A1 * | 10/2002 | Amin et al. ..................... | 709/232 |
| 2005/0047564 | A1 * | 3/2005 | Askerup ..................... | 379/88.22 |
| 2005/0068965 | A1 * | 3/2005 | Lin et al. ..................... | 370/395.21 |
| 2007/0097862 | A1 * | 5/2007 | Moon et al. .................... | 370/230 |
| 2007/0105563 | A1 * | 5/2007 | Ro et al. ........................ | 455/452.2 |
| 2007/0195818 | A1 * | 8/2007 | Stephenson et al. .......... | 370/468 |
| 2007/0242649 | A1 | 10/2007 | Kumar et al. | |

FOREIGN PATENT DOCUMENTS

| | | |
|---|---|---|
| EP | 1 806 875 A | 7/2007 |
| WO | WO 2007/045278 A | 4/2007 |

OTHER PUBLICATIONS

International Search Report and Written Opinion dated Mar. 4, 2009 in PCT/US2008/012105, Lucent Technologies Inc., Applicant, 16 pages.
Garg W et al: "Admission control for VoIP traffic in IEEE 802.11 networks" GLOBECOM'03, 2003—IEEE Global Telecommunications Conference. Conference Proceedings. San Francisco, CA, Dec. 1-5, 2003 [IEEE Global Telecommunications Conference], New York, NY : IEEE, US, vol. 6, Dec. 1, 2003, pp. 3514-3518, XP010677205 ISBN: 978-0-7803-7974-9 abstract p. 3514, left-hand column, line 1-p. 3515, left-hand column, line 28,-p. 3516, right-hand column, line 52-p. 3518, right-hand column, line 11.

* cited by examiner

*Primary Examiner* — Chirag Shah
*Assistant Examiner* — Minh-Trang Nguyen
(74) *Attorney, Agent, or Firm* — Wall & Tong, LLP (57) ABSTRACT

The invention includes a method and apparatus providing call admission control for a wireless local area network (WLAN). A method includes extracting call signaling information from call signaling messages exchanged between a first user terminal and a second user terminal for establishing a voice call, where the second user terminal is being served by a wireless access point, and propagating a quality-of-service request toward the wireless access point which may be used by the wireless access point for determining whether or not to accept the voice call. The quality-of-service request includes at least one quality-of-service parameter determined using the extracted call signaling information. The at least one quality-of-service parameter is adapted for use by the wireless access point for determining whether or not to accept the voice call. The wireless access point then provides an indication as to whether it has accepted the voice call (in which case the voice call is completed) or whether it has rejected the voice call (in which case some other call handling may be applied to the voice call).

20 Claims, 4 Drawing Sheets

000
METHOD AND APPARATUS FOR PROVIDING CALL ADMISSION CONTROL FOR VOIP OVER WIRELESS LOCAL AREA NETWORKS USING A TRANSPARENT PROXY AGENT

FIELD OF THE INVENTION

The invention relates to the field of communication networks and, more specifically, to call admission in wireless local area networks (WLANs).

BACKGROUND OF THE INVENTION

A WiFi "hotspot" provides a wireless access point by which users may access a wireless LAN (WLAN) for data communications, VoIP calls, and like services. As WiFi "hotspots" become more common, and more users being using WiFi "hotspots" to place VoIP calls, call admission control is becoming quite important in order to ensure that WiFi "hotspots" do not become overloaded. The application of call admission control on a pervasive WLAN is more complicated than simply prioritizing real-time traffic over non-real-time traffic or allowing a predetermined number of calls. WLAN traffic is non-deterministic and, further, channel access is based on a binary back-off algorithm and is, by nature, variable, based on the number of clients accessing the network.

Disadvantageously, existing call admission control schemes in WLANs do not work well. For example, placement of a static limit on the number of wireless user terminals that can access a WiFi "hotspot" results in an inefficient use of the resources available at the WiFi "hotspot". Furthermore, requiring the wireless user terminals to register with the WiFi "hotspots" is expensive, both in terms of the additional complexity of the wireless user terminal (i.e., to enable the wireless user terminal to determine what resources is may require for a call in the future) and in terms of resources wasted at the WiFi hotspot (i.e., since the WiFi "hotspot" must reserve bandwidth for each wireless user terminal, regardless of whether or not the wireless user terminal will ever use the reserved bandwidth).

SUMMARY OF THE INVENTION

Various deficiencies in the prior art are addressed through the invention of a method and apparatus providing call admission control for a wireless local area network (WLAN). A method includes extracting call signaling information from call signaling messages exchanged between a first user terminal and a second user terminal for establishing a voice call, where the second user terminal is being served by a wireless access point, and propagating a quality-of-service request toward the wireless access point which may be used by the wireless access point for determining whether or not to accept the voice call. The quality-of-service request includes at least one quality-of-service parameter determined using the extracted call signaling information. The at least one quality-of-service parameter is adapted for use by the wireless access point for determining whether or not to accept the voice call. The wireless access point then provides an indication as to whether it has accepted the voice call (in which case the voice call is completed) or whether it has rejected the voice call (in which case some other call handling may be applied to the voice call).

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention provides improved call admission control in wireless local area networks (WLANs) using a call admission control proxy. The call admission control proxy monitors call signaling associated with a request to setup a voice call with wireless user terminal being served by a wireless access point, determines quality-of-service information including one or more quality-of-service parameters required to be supported by the wireless access point for the requested voice call, and propagates the quality-of-service information to the wireless access point for use by the wireless access point in determining whether to accept or reject the voice call request.

The present invention obviates the need for the wireless user terminal to include intelligence for informing the wireless access point of the quality of service parameter(s) required to be supported by the wireless access point for voice calls for the wireless user terminal. The present invention further obviates the need for statically configuring call legs. The present invention can be used in conjunction with various different signaling protocols (e.g., H.323, Media Gateway Control Protocol (MGCP), Session Initiation Protocol (SIP), and the like, as well as various combinations thereof).

Figure 1:
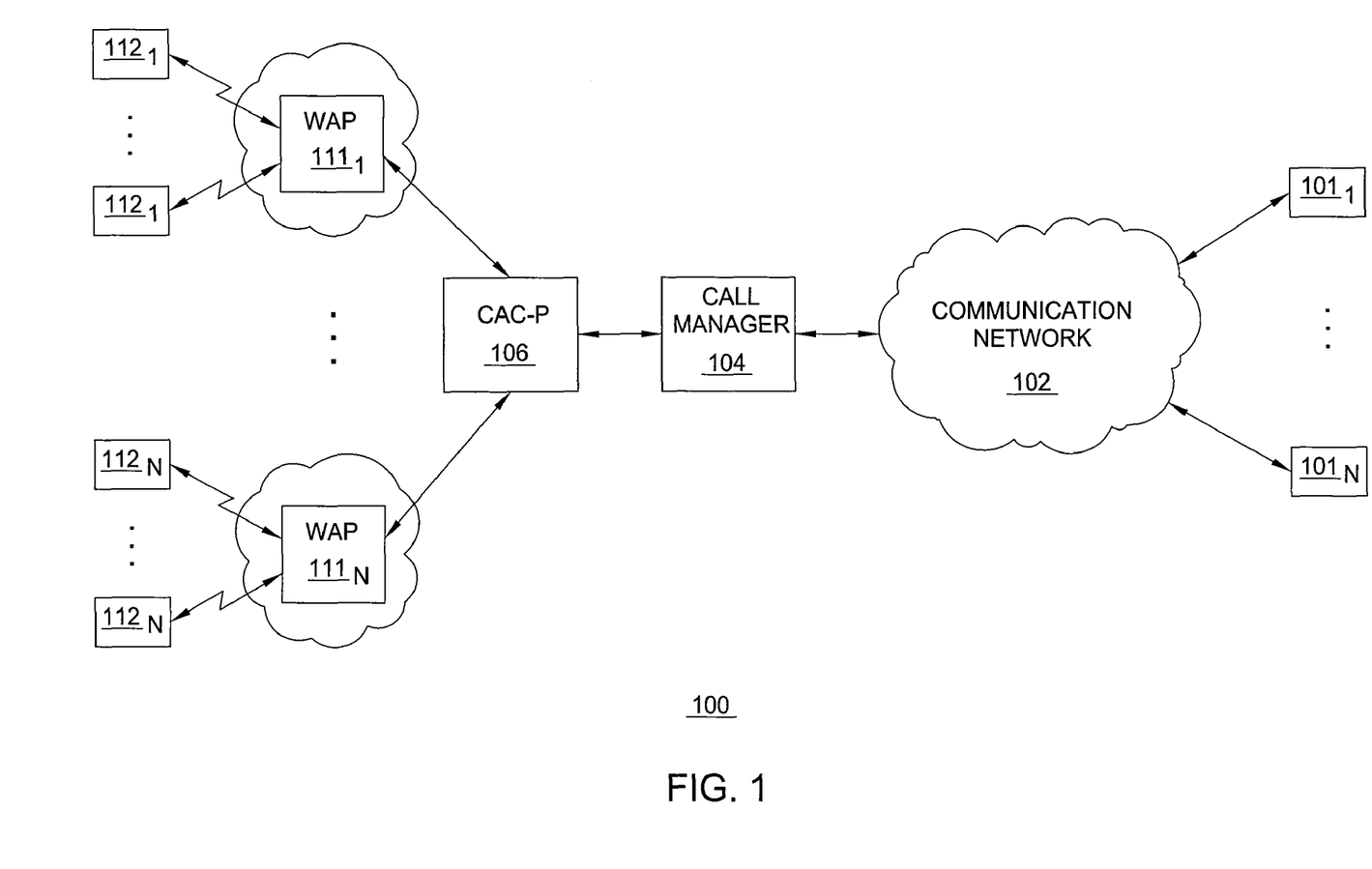
FIG. 1 depicts a high-level block diagram of a communication network architecture.

FIG. 1 depicts a high-level block diagram of a communication network architecture. Specifically, communication network architecture 100 includes a communication network (CN) 102, a call manager (CM) 104, and multiple wireless local area networks $110_1$-$110_N$ (collectively, WLANs). The WLANs $110_1$-$110_N$ include wireless access points $111_1$-$111_N$ (collectively, WAPs), respectively. The communication network architecture 100 further includes a call admission control proxy (CAC-P) 106 adapted for providing call admission control functions (and associated quality-of service functions) of the present invention.

The CN 102 is a packet-based network, supporting VoIP services (as well as other services) for user terminals. Specifically, CN 102 provides network access for user terminals $101_1$-$101_N$ (collectively, user terminals 101). The user terminals 101 may include any wired user terminals and/or wireless user terminals capable of participating in voice calls over a packet-based network. For example, user terminals 101 may include VoIP phones, WiFi phones, and the like. The CN 102 supports propagation of call signaling (e.g., call setup, call modification, and call teardown signaling) for user terminals 101. The CN 102 supports propagation of voice data for user terminals 101. Although depicted as one communication network, CN 102 may be a collection of networks (e.g., access networks, core networks, and the like, as well as various combinations thereof).

The WLANs 110 operate as wireless access networks, supporting VoIP services (as well as other services) for wireless user terminals. Specifically, WAPs $111_1$-$111_N$ of WLANS $110_1$-$110_N$ provide wireless network access for respective pluralities of wireless user terminals $112_{11}$-$112_{1N}$ through $112_{N1}$-$112_{NN}$ (collectively, wireless user terminals 112). The wireless user terminals 112 may include any wireless user terminals capable of participating in voice calls over a wireless local area network. For example, wireless user terminals 112 may include WiFi phones (or any other wireless devices capable of communicating via a WLAN). The WAPs 111 support propagation of call signaling (e.g., call setup, call modification, and call teardown signaling) for wireless user terminals 112. The WAPs 111 support propagation of voice data for wireless user terminals 112.

The CM 104 provides call management functions for managing calls between user terminals 101 and wireless user terminals 112. The call management functions may include functions such as call admission control functions, call handling functions, and the like, as well as various combinations thereof. The CM 104 supports call setup signaling for establishing voice calls, associated signaling for negotiating and modifying characteristics of established voice calls, and call termination signaling for terminating voice calls. The CM 104 supports such functions for voice calls for user terminals 101 and wireless user terminals 112.

The communication network architecture 100 may be implemented using various types of networks and associated network protocols which may support packet-based voice services. For example, communication network architecture 100 may support signaling protocols such as Session Initiation Protocol (SIP), Media Gateway Control Protocol (MGCP), H.323, Skinny Client Control Protocol (SCCP), UA/NOE, and the like, as well as various combinations thereof). In one embodiment, WLANs 110, and associated WAPs 111, may be based on IEEE 802.11 (although the present invention may be used in conjunction with any type of wireless local area network requiring call admission control).

Since wireless user terminals are mobile and, thus, may move between wireless access points, the number of active wireless user terminals (and, thus, the amount of bandwidth, as well as other associated quality-of-service parameters) that must be supported by each wireless access point changes dynamically. As described herein, the present invention provides a means by which wireless access points may determine whether to accept or reject call requests to wireless user terminals in such a dynamic environment. The present invention utilizes a call admission control proxy (illustratively, CAC-P 106) for providing quality-of-service information to a wireless access point, for use by the wireless access point in determining whether to accept or reject voice calls on the basis of the quality-of-service that the wireless access point is capable of providing.

The CAC-P 106 performs call admission control support functions for enabling WAPs 111 to control controls admission of voice calls for wireless user terminals 112 being served by WAPs 111. The CAC-P 106 is able to maintain context for voice calls for wireless user terminals 112, thereby providing CAC-P 106 access to signaling information which CAC-P 106 uses to determine quality-of-service information for WAPs 111. The CAC-P 106 propagates the quality-of service information to WAPs 111 for use by WAPs 111 in determining whether to accept or reject voice calls. The operation of CAC-P 106 in providing the call control functions of the present invention may be better understood with respect to the example of FIG. 2 and the method of FIG. 3.

Although primarily depicted and described herein as a standalone network element deployed between a call manager and wireless access points, the call admission control proxy may be implemented as one or more modules on one or more network elements, which may include existing network elements and/or new network elements. In one embodiment, the CAC-P module may be implemented on a CM. In one embodiment, the CAC-P module may be implemented on each WAP. The CAC-P module may also be implemented on gateways, routers, switches, firewalls, and the like, as well as various combinations thereof. In other words, CAC-P 106 may be implemented in any manner as long as CAC-P has access to call signaling between user terminals 101 and wireless user terminals 112.

Figure 2:
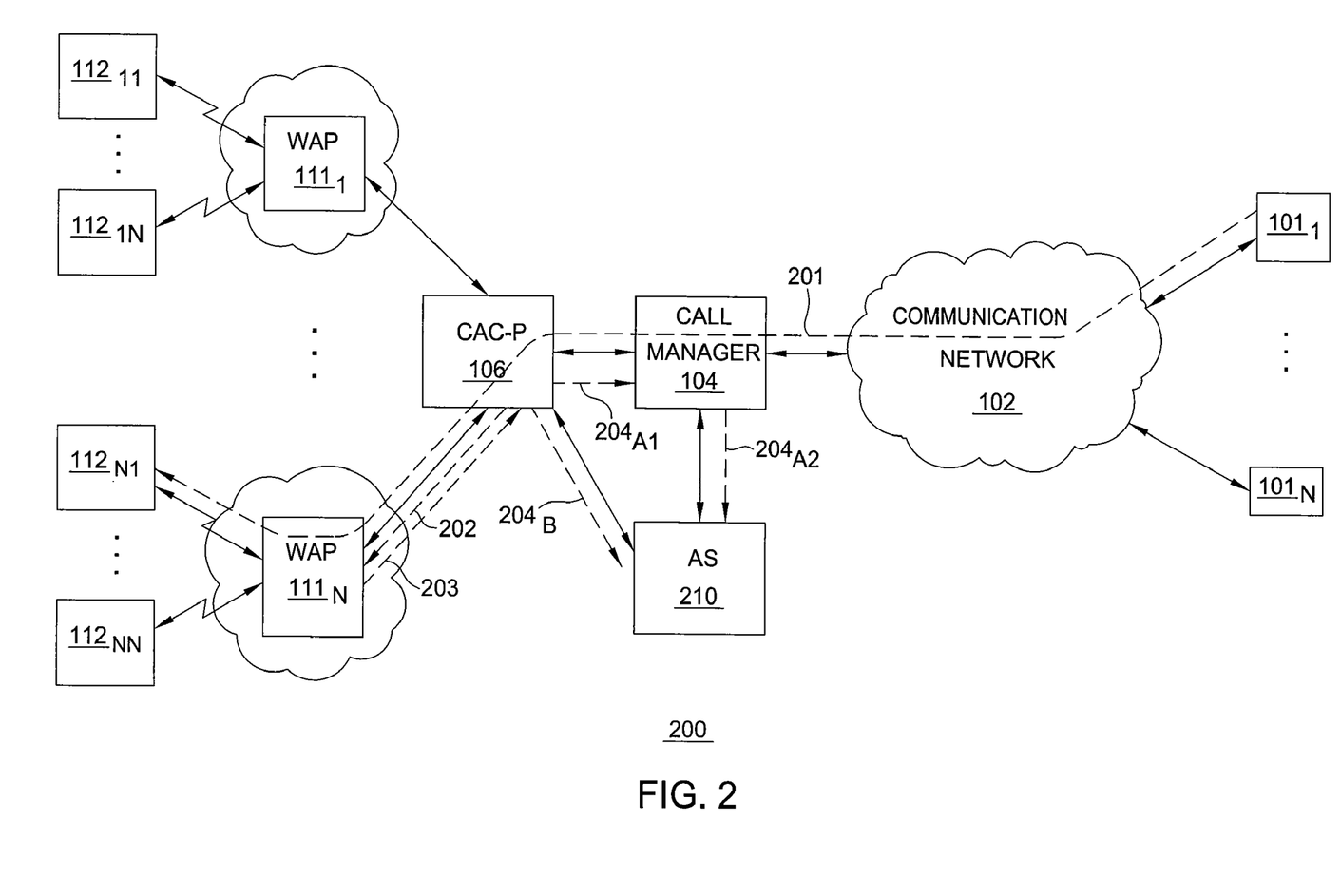
FIG. 2 depicts the communication network architecture of FIG. 1 showing interactions between network elements for providing call admission control.

FIG. 2 depicts the communication network architecture of FIG. 1 showing interactions between network elements for providing call admission control.

As depicted in FIG. 2, one of the user terminals 101 (illustratively, user terminal $101_1$) initiates a voice call to one of the wireless user terminals (illustratively, wireless user terminal $112_{N1}$). In order to establish the voice call, user terminal $101_1$ and wireless user terminals $112_{N1}$ exchange call setup signaling messages (denoted as signaling 201). The user terminal $101_1$ propagates call setup signaling messages to wireless user terminal $112_{N1}$ via CM 102, CAC-P 106, and AP $111_N$, and, similarly, wireless user terminal $112_{N1}$ propagates call setup signaling messages to user terminal $101_1$ via AP $111_N$, CAC-P 106, and CM 102.

The call setup signaling messages exchanged between user terminal $101_1$ and wireless user terminal $112_{N1}$ include signaling information. The signaling information includes information such as source address, destination address, and the like, as well as various combinations thereof. The call setup signaling messages exchanged between user terminal $101_1$ and wireless user terminals $112_{N1}$ also includes information associated with the codec(s) being negotiated between user terminal $101_1$ and wireless user terminal $112_{N1}$ (i.e., the codec (s) to be used by user terminal $101_1$ and wireless user terminals $112_N$ in the event that the voice call is successfully established).

As described herein, the present invention may be used in conjunction with any signaling protocol, such as SIP, MGCP, H.323, SCCP, UA/NOE, and the like, as well as various combinations thereof. The signaling information may vary across signaling protocols, as well as across different messages of a given signaling protocol; however, as long as CAC-P 106 is able to extract the signaling information required for determining corresponding quality-of-service information, CAC-P 106 may support any signaling protocol.

As depicted in FIG. 2, call signaling messages exchanged between user terminal $101_1$ and wireless user terminal $112_{N1}$ traverse CAC-P 106. The CAC-P 106 processes the call signaling messages in order to extract signaling information adapted for use by CAC-P 106 in (1) identifying the WAP 111 that is currently serving wireless user terminal $112_{N1}$ (illustratively, WAP $111_N$) and (2) requesting a particular quality-of-service from identified WAP $111_N$ (i.e., the quality-of-service parameters required to be supported by WAP $111_N$ in the event that the voice call is successfully established). The CAC-P 106 performs deep packet inspection of the call setup signaling messages in order to extract the signaling information.

The QOS information determined by CAC-P 106 specifies one or more QOS parameters required to be supported by WAP $111_N$ in order to support the voice call between user terminal $101_1$ and wireless user terminal $112_{N1}$. For example, the QOS information may specify one or more bandwidth characteristics, such as a data rate parameter (e.g., a data rate required to be supported by AP $111_{N1}$), a jitter parameter (e.g., a level of jitter required to be supported by AP $111_{N1}$), a latency parameter (e.g., a level of latency required to be supported by WAP $111_N$), and the like, as well as various combinations thereof. The QOS information may include other bandwidth characteristics, and/or any other information which may be required or specified for a voice call over a packet-based network.

The CAC-P 106 determines the QOS parameters from the extracted signaling information. For example, CAC-P 106 may determine the bandwidth characteristics (such as data rate, jitter requirements, latency requirement, and the like, as well as various combinations thereof) from the codec negotiated between user terminal $101_1$ and wireless user terminal $112_{N1}$. The CAC-P 106 accounts for both call legs of the requested voice call between user terminal $101_1$ and wireless user terminal $112_{N1}$ (i.e., the QOS information determined by CAC-P 106 will specify the QOS requirements which must be supported by WAP $111_N$ in order to support both call legs of the requested voice call).

For example, for a G.711 codec, which requires a data rate of 64 Kbps for voice communications, the QOS information determined by CAC-P 106 will specify that 128 Kbps of bandwidth must be available at WAP $111_N$ in order to support both call legs of the requested voice call. Similarly, for example, for a G.726 codec, which may use data rates of 16, 24, 32, or 40 Kbps, assuming that CAC-P 106 determines from signaling information that a data rate of 16 Kbps will be used, the QOS information determined by CAC-P 106 will specify that 32 Kbps of bandwidth must be available at WAP $111_N$ in order to support both call legs of the requested voice call. Although the foregoing examples are described with respect to specific codecs, various other codecs may be used for providing packet-based voice connections.

The CAC-P 106 propagates the QOS information to WAP $111_N$ in the form of a QOS request, i.e., a request for WAP $111_N$ to determine whether or not it can support the QOS parameter(s) specific in the QOS information for the requested voice call (denoted as QOS request 202). The QOS request includes the QOS information determined by CAC-P 106. The CAC-P 106 may propagate the QOS request to WAP $111_N$ in any format. In one embodiment, CAC-P 106 propagates the QOS request to WAP $111_N$ according to TSPEC standards. In one embodiment, CAC-P 106 propagates the QOS request to WAP $111_N$ using an Application Programming Interface (API), which may be a standard API and/or proprietary API. The CAC-P 106 may propagate the QOS information to WAP $111_N$ in any other format.

The WAP $111_N$ receives the QOS information from CAC-P 106. The WAP $111_N$ determines, based on the QOS information included in the QOS request, whether to accept or reject the requested voice call. The WAP $111_N$ determines whether to accept or reject the requested voice call by determining, based on the QOS information included in the QOS request, whether or not it is capable of supporting the requested level of QOS for the requested voice call. For example, where the QOS request includes a request for a specific amount of bandwidth required to support the requested voice call, WAP $111_N$ determines whether there is sufficient bandwidth available at WAP $111_N$ to support the requested amount of bandwidth. The WAP $111_N$ may make similar determinations with respect to any other QOS parameter(s) which may be specified in the QOS request (e.g., jitter, latency, and the like, as well as various combinations thereof).

If the WAP $111_N$ accepts the requested voice call, WAP $111_N$ reserves the bandwidth requested in the QOS request so that the bandwidth will be available to wireless user terminal $112_{N1}$ for voice communications between user terminal 101 and wireless user terminal $112_{N1}$. If the WAP $111_N$ rejects the requested voice call, WAP $111_N$ does not reserve the bandwidth requested in the QOS request. In either case, WAP $111_N$ propagates an appropriate response to CAC-P 106 (i.e., a response indicative of whether WAP $111_N$ can or cannot support the requested voice call and, thus, whether WAP $111_N$ has accepted or rejected the requested voice call).

The WAP $111_N$ propagates a QOS response to CAC-P 106 (denoted as QOS response 203). The QOS response provides an indication as to whether AP $111_N$ accepts or rejects the requested voice call. The QOS response may be propagated from AP $111_N$ to CAC-P 106 in any format. In one embodiment, WAP $111_N$ propagates the QOS response to CAC-P 106 in the format with which CAC-P 106 propagated the corresponding QOS request to WAP $111_N$. In one embodiment, WAP $111_N$ propagates the QOS response to CAC-P 106 using the call signaling protocol of the call signaling messages used during the call setup signaling between user terminal $101_1$ and wireless user terminal $112_{N1}$. The WAP $111_N$ may provide the QOS response to CAC-P 106 in any other manner.

The CAC-P 106 processes the QOS response from WAP $111_N$. As described herein, processing of the QOS response depends on whether the QOS response is indicative that WAP $111_N$ has accepted the requested voice call or rejected the requested voice call.

If the QOS response is indicative that WAP $111_N$ has accepted the requested voice call, CAC-P 106 initiates completion of the requested voice call. In one embodiment, CAC-P 106 may initiate signaling to complete the requested voice call. In one embodiment, CAC-P may inform one or more other network elements that the requested voice call has been accepted by WAP $111_N$ and, thus, that call setup signaling adapted for completing setup of the requested voice call should be performed. In one such embodiment, for example, CAC-P 106 may propagate a message to CM 104 (denoted as message $205_A$) which triggers CM 104 to initiate call setup signaling adapted for completing setup of the requested voice call.

If the QOS response is indicative that WAP $111_N$ has rejected the requested voice call, CAC-P 106 initiates call handling processing for the requested voice call. The call handling processing for the requested voice call may be performed by CAC-P 106, or CAC-P 106 may trigger one or more other network elements to perform call handling processing for the requested voice call.

In one embodiment, for example, CAC-P 106 may provide an indication to CM 104 that WAP $111_N$ has rejected the voice call (denoted as messaging $204_{A1}$), thereby triggering CM 104 to initiate some call handling. In one further embodiment, CM 104 may initiate call handling by signaling one or more other network elements, such as an application server (illustratively, AS 210), to apply some call handling rule(s) (denoted as messaging $204_{A2}$).

In one embodiment, for example, CAC-P 106 may provide an indication to one or more other network elements, such as an application server (illustratively, AS 210), that WAP $111_N$ has rejected the voice call (denoted as messaging $204_B$), thereby triggering the one or more other network elements to initiate some call handling.

The call handling may be initiated or provided in various other ways.

In such embodiments, any type of call handling may be applied to the voice call request in response to rejection of the requested voice call by WAP $111_N$. For example, call handling may include providing a busy indicator to the calling user (illustratively, to user terminal $101_1$), forwarding the voice call to the voicemail of the called user (i.e., the voicemail of the user of wireless user terminal $112_{N1}$), forwarding the voice call to another user terminal of the called user, and the like, as well as various combinations thereof. The call handling applied to the requested voice call may include any other call handling.

In such embodiments, the signaling/messaging that is utilized to provide the desired call handling may be implemented using any Application Programming Interface(s). For example, the call handling may be provided using one or more of function calls, the Simple Network Management Protocol (SNMP), the Extensible Markup Language (XML), and the like, as well as various combinations thereof.

Figure 3:
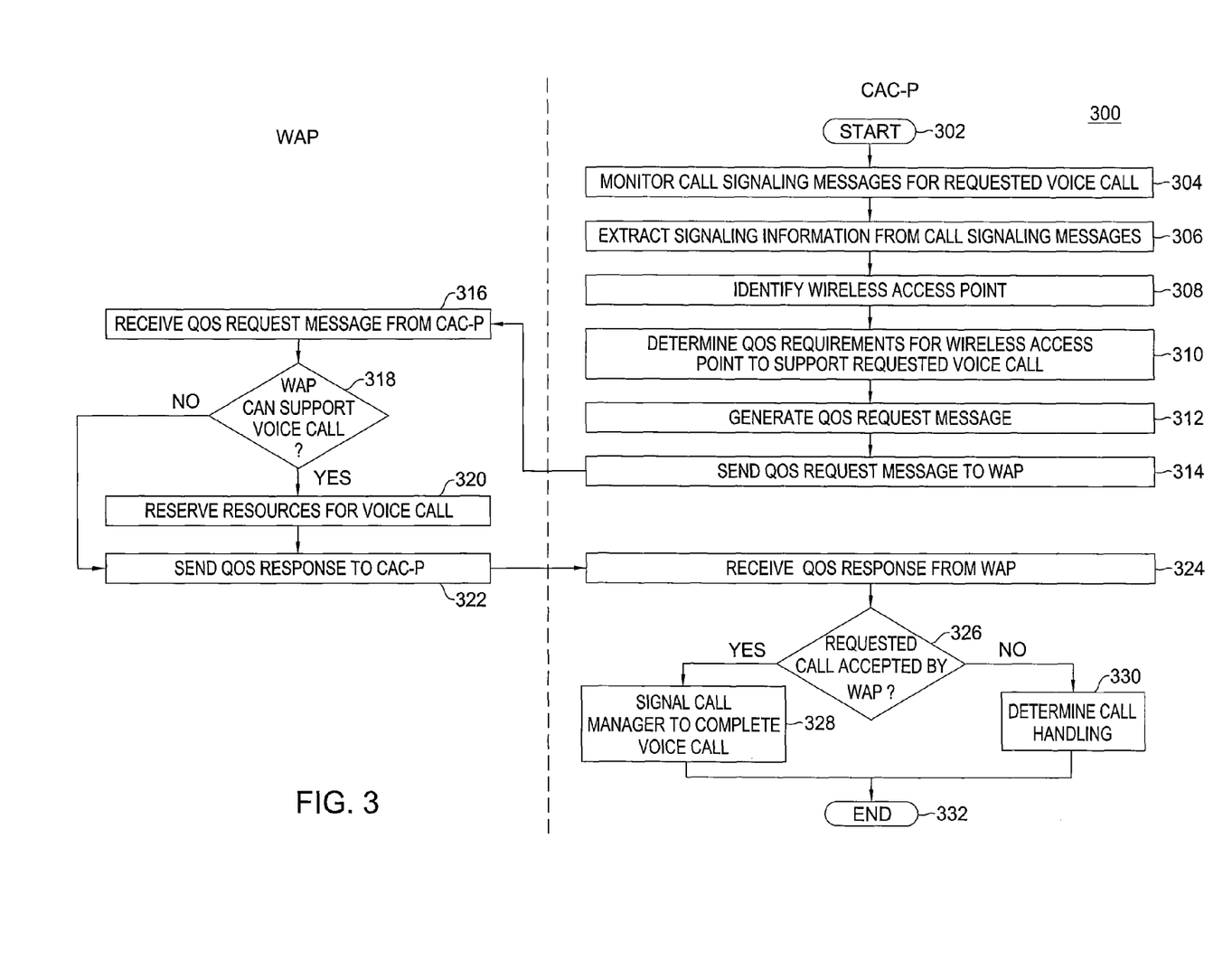
FIG. 3 depicts a method according to one embodiment of the present invention.

The operation of CAC-P 106 and WAPs 111 in providing the call admission control functions (and the associated quality-of-service functions) of the present invention may be better understood with respect to FIG. 3 depicted and described herein.

FIG. 3 depicts a method according to one embodiment of the present invention. Specifically, method 300 of FIG. 3 includes a method for providing call admission control functions for a wireless access point of a wireless local area network. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, call signaling messages are monitored. The call signaling messages are messages exchanged for purposes of establishing a voice call from a user terminal (wired or wireless) to a wireless user terminal associated with a wireless access point (WAP). At step 306, signaling information is extracted from the call signaling messages. At step 308, the WAP currently serving the wireless user terminal is identified.

At step 310, QOS requirements required for the WAP to support the requested voice call are determined. The QOS requirements are determined from the signaling information. The QOS requirements may include bandwidth characteristics (e.g., required data rate, acceptable jitter, acceptable latency, and the like). The QOS requirements may include any other characteristics which may be specified for the requested voice call.

At step 312, a QOS request message is generated. The QOS request message includes the QOS information. The QOS request message may specify the QOS information in any format. For example, the QOS request message may specify the QOS information using the TSPEC standard, using an API, and the like, as well as various combinations thereof. At step 314, the QOS request message is sent to the WAP.

At step 316, the QOS request message is received at the WAP. At step 318, the WAP determines whether or not the requested voice call can be supported. The WAP determines whether or not the requested voice call can be supported using the QOS information included in the QOS request and WAP status information (i.e., information about the current status of resources on the WAP).

If the WAP can support the requested voice call, method 300 proceeds to step 320, at which point the WAP reserves resources for the voice call (i.e., based on the QOS requested in the QOS request), and then method 300 proceeds to step 322, at which point the WAP sends a QOS response back to the CAC-P. If the WAP cannot support the requested voice call, method 300 proceeds to step 322, at which point the WAP sends a QOS response back to the CAC-P.

At step 324, the CAC-P receives the QOS response from the WAP. If the WAP has accepted the voice call on the basis of the QOS information, the QOS response is indicative that the WAP has accepted the voice call. If the WAP has rejected the voice call on the basis of the QOS information, the QOS response is indicative that the WAP has rejected the voice call.

At step 325, a determination is made as to whether the requested voice call has been accepted or rejected by the WAP. If the call has been accepted, method 300 proceeds to step 328, at which point the WAP signals a call manager to complete the voice call. If the call has been rejected, method 300 proceeds to step 330, at which point the WAP determines appropriate call handling for the voice call.

From steps 328 and 330, method 300 proceeds to step 332, where method 300 ends. Although depicted and described as ending, as described herein additional signaling/messaging may be performed by the CAC-P and/or the WAP in order to either complete the voice call and support the associated voice communications for the voice call, or to apply any call handling which may be specified (e.g., providing a busy signal, forwarding the call to voicemail, and the like, as well as various combinations thereof).

Although primarily depicted and described herein with respect to call admission control in response to a requested voice call, the call admission control proxy of the present invention may also provide functions associated with call modifications and call terminations.

In one embodiment, for example, the CAC-P may monitor call signaling messages exchanged between two user terminals while a voice call is active. The call signaling messages may be exchanged for the purpose of modifying one or more aspects of the existing voice call (e.g., renegotiating the codec being used, or any other modifications). The CAC-P extracts signaling information from the call signaling messages. The CAC-P processes the signaling information to determine updated QOS information, and propagates the updated QOS information to the WAP, which may be used by the WAP in order to determine whether to accept or reject the requested modification(s) to the voice call.

In this embodiment, if the WAP determines, from the updated QOS information, that the requested modification(s) to the voice call can be supported, the WAP provides an indication to CAC-P that the requested modification(s) can be supported. In this case, the requested modification(s) may then be applied to the voice call. In this embodiment, if the WAP determines, from the updated QOS information, that the requested modification(s) to the voice call cannot be supported, the WAP provides an indication to CAC-P that the requested modification(s) cannot be supported. In this case, the requested modification(s) will not be applied to the voice call.

In one embodiment, for example, the principles of the present invention may be utilized in support of call admission control at wireless access points for priority voice calls. In one such embodiment, if a determination is made that a WAP cannot support a requested voice call, a determination may be made, based on the priority of the requested voice call, as to whether one or more existing voice calls should be preempted by the requested voice call. The requested voice call is then accepted or rejected by the WAP on the basis of the determination. The application of the principles of the present invention may be implemented in various different ways.

The priorities of voice calls may be defined in any manner. In one embodiment, for example, emergency calls (e.g., 911 calls or calls to any other emergency numbers) may be given priority over non-emergency calls. In another embodiment, for example, in an enterprise environment, priority may be based on job function or any other factor(s). For example, voice calls by officers and high-level managers of the company may be given priority over voice calls by any other employees of the company. The priorities of voice calls may be defined in various other ways (e.g., any number of priority levels may be used, the priority levels may be defined in any way, and the like, as well as various combinations thereof).

The priority of the voice call(s) may be determined in any manner. In one embodiment, the priority of the requested voice call may be determined by extracting call signaling information from call signaling messages that are exchanged between user terminals for establishing the requested voice call. Similarly, in an embodiment in which acceptance of the requested voice call is dependent on the priorities of the existing voice calls, the priorities of the existing voice calls may be determined in any manner (e.g., by extracting signaling exchanged when the voice calls are established, via queries as needed, and the like, as well as various combinations thereof).

The determination as to whether or not one or more existing voice calls should be preempted by a requested voice call on the basis of priority may be implemented in many ways (e.g., determining if the priority of the requested voice call satisfies a condition or conditions, or in any other manner). In one embodiment, for example, a determination may be made as to whether the requested voice call has a priority that is greater than a threshold and, if it does, one or more of the existing voice calls is preempted and the requested voice call is accepted. In another embodiment, for example, a determination may be made as to whether the requested voice call has a priority that is greater than the priority of any of the existing voice calls supported by the WAP and, If it does, one or more of the lower priority voice calls is preempted and the requested voice call is accepted.

The requested voice call is then accepted or rejected by the WAP on the basis of the determination as to whether one or more existing voice calls should be preempted by the requested voice call. If a determination is made that one or more existing voice calls should be preempted, the requested voice call will be accepted by the WAP. If a determination is made that one or more existing voice calls should not be preempted, the requested voice call will be rejected by the WAP. The acceptance/rejection of the requested voice call may be performed in any manner (e.g., using the QOS request and QOS response messaging depicted and described herein, or in any other manner by which the requested voice call may be accepted or rejected).

Although primarily depicted and described with respect to a specific application of the principles of the present invention to call admission control based on call priority, it will be understood that the principles of the present invention may be applied in various other ways to provide call admission control for various other applications.

Figure 4:
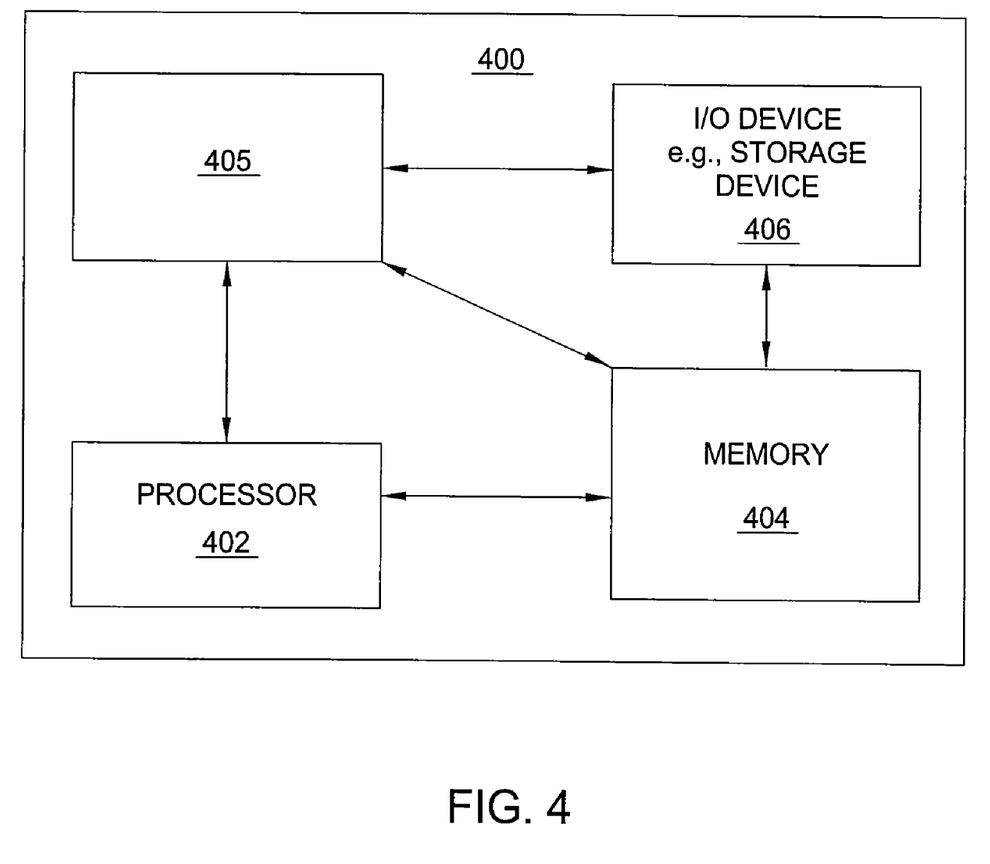
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a call admission control proxy module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present call admission control proxy process 405 can be loaded into memory 404 and executed by processor 402 to implement the functions as discussed above. As such, call admission control proxy process 405 (including associated data structures) of the present invention can be stored on a computer readable medium or carrier, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for providing call admission control for a wireless local area network (WLAN), comprising:
   extracting an active call signaling information from call signaling messages exchanged between a first user terminal and a second user terminal for modifying one or more aspects of an existing voice call, wherein the second user terminal is associated with a wireless access point; and
   propagating a quality-of-service request toward the wireless access point, wherein the quality-of-service request comprises at least one quality-of-service parameter determined using the extracted active call signaling information, wherein the at least one quality-of-service parameter is adapted for use by the wireless access point for determining whether or not to accept the requested modification to the active voice call.

2. The method of claim 1, wherein the at least one quality-of-service parameter comprises an amount of bandwidth required for the wireless access point to support the modification to the voice call.

3. The method of claim 1, wherein the at least one quality-of-service parameter comprises at least one of a jitter requirement and a latency requirement.

4. The method of claim 1, wherein the quality-of-service request is formatted using one of a TSPEC format and an Application Programming Interface (API) format.

5. The method of claim 1, further comprising:
   receiving a quality-of-service response from the wireless access point, wherein the quality-of-service response provides an indication as to whether the wireless access point is accepting or rejecting the modification to the voice call.

6. The method of claim 5, further comprising:
   in response to a quality-of-service response indicative that the wireless access point accepts the modification to the voice call, propagating a message to a call manager for applying the requested modification to the voice call.

7. The method of claim 5, further comprising:
in response to a quality-of-service response indicative that the wireless access point rejects the voice call, applying call admission control for priority voice calls.

8. The method of claim 7, wherein the call admission control comprises, determining based on the priority of the requested voice call whether one or more existing voice calls should be preempted by the requested voice call.

9. The method of claim 1, further comprising:
identifying the wireless access point serving the second user terminal using at least one address included in the extracted signaling information.

10. An apparatus for providing call admission control for a wireless local area network (WLAN), comprising:
means for extracting an active call signaling information from call signaling messages exchanged between a first user terminal and a second user terminal for modifying one or more aspects of an existing voice call, wherein the second user terminal is associated with a wireless access point; and
means for propagating a quality-of-service request toward the wireless access point, wherein the quality-of-service request comprises at least one quality-of-service parameter determined using the extracted active call signaling information, wherein the at least one quality-of-service parameter is adapted for use by the wireless access point for determining whether or not to accept the requested modification to the active voice call.

11. The apparatus of claim 10, wherein the at least one quality-of-service parameter comprises an amount of bandwidth required for the wireless access point to support the modification to the voice call.

12. The apparatus of claim 10, wherein the at least one quality-of-service parameter comprises at least one of a jitter requirement and a latency requirement.

13. The apparatus of claim 10, wherein the quality-of-service request is formatted using one of a TSPEC format and an Application Programming Interface (API) format.

14. The apparatus of claim 10, further comprising:
means for receiving a quality-of-service response from the wireless access point, wherein the quality-of-service response provides an indication as to whether the wireless access point is accepting or rejecting the modification to the voice call.

15. The apparatus of claim 14, further comprising:
means for propagating a message to a call manager for establishing the voice call, wherein the message is propagated in response to a quality-of-service response indicative that the wireless access point accepts the modification to the voice call.

16. The apparatus of claim 14, further comprising:
means for applying call handling processing to the voice call request in response to a quality-of-service response indicative that the wireless access point rejects the modification to the voice call.

17. The apparatus of claim 16, wherein the call handling processing comprises determining based on the priority of the requested voice call whether one or more existing voice calls should be preempted by the requested voice call.

18. The apparatus of claim 10, further comprising:
means for identifying the wireless access point serving the second user terminal using at least one address included in the extracted signaling information.

19. A method for providing call admission control for a wireless local area network (WLAN), comprising:
receiving a quality-of-service request at a wireless access point, wherein the quality-of-service request comprises at least one quality-of-service parameter determined using call signaling information associated with an active call signaling messages exchanged for modifying one or more aspects of an existing voice call between a pair of user terminals,
determining, using the quality-of-service request, whether to accept or reject the requested modification to the voice call at the wireless access point; and
propagating a quality-of-service response from the wireless access point, wherein the quality-of-service response provides an indication as to whether the wireless access point is accepting or rejecting the requested modification to the active voice call.

20. A method, comprising:
receiving a quality-of-service request at a wireless access point, wherein the quality-of-service request comprises at least one quality-of-service parameter determined using call signaling information associated with an active call signaling messages exchanged for modifying one or more aspects of an existing voice call between a pair of user terminals,
in response to a determination, using the quality-of-service request, that the voice call cannot be supported by the wireless access point, determining a priority of the requested modification to the voice call; and
if the priority of the voice call satisfies a condition, modifying the active voice call by preempting at least one existing voice call supported by the wireless access point wherein the at least one quality-of-service parameter is adapted for use by the wireless access point for determining whether or not to accept the requested modification to the active voice call.

* * * * *